(12) United States Patent
Sawyer

(10) Patent No.: US 8,250,936 B1
(45) Date of Patent: Aug. 28, 2012

(54) UTILITY VIEWER

(76) Inventor: Tyrone D. Sawyer, Sandston, VA (US)

( * ) Notice: Subject to any disclaimer, the term of this patent is extended or adjusted under 35 U.S.C. 154(b) by 254 days.

(21) Appl. No.: 12/798,080

(22) Filed: Mar. 30, 2010

(51) Int. Cl.
*G01L 19/14* (2006.01)
(52) U.S. Cl. ...................................................... 73/865.8
(58) Field of Classification Search ........................ None
See application file for complete search history.

(56) References Cited

U.S. PATENT DOCUMENTS

| 3,850,457 | A | | 11/1974 | Bigotte |
| 4,329,882 | A | | 5/1982 | Karup |
| 4,938,081 | A | * | 7/1990 | Negishi .................. 73/865.8 |
| 7,493,817 | B2 | | 2/2009 | Germata |
| 2007/0013800 | A1 | * | 1/2007 | Pope ..................... 348/333.01 |

FOREIGN PATENT DOCUMENTS

JP  358180932  * 10/1983

* cited by examiner

*Primary Examiner* — Robert R Raevis
(74) *Attorney, Agent, or Firm* — Paul R. Martin

(57) ABSTRACT

A device is used to view utilities that have been potholed and covered up due to rain or crew shutdowns. The device includes a cylindrical body which is driven into the ground and has a light so the pipe can be viewed from above ground.

5 Claims, 4 Drawing Sheets

UTILITY VIEWER

TECHNICAL FIELD OF THE INVENTION

The present invention relates to the general art of pipeline and utility maintenance, and to the particular field of accessories for servicing in-ground utilities and pipelines.

BACKGROUND OF THE INVENTION

Much of the lifeblood of the world economy flows through pipeline transportation systems. Large volumes of products as diverse as petroleum and liquid hydrocarbons, natural gas, propane, and slurries of solids such as granulated coal and minerals such as copper and iron are constantly being transported between production sites and processing and consumption sites over long distances. These pipelines range generally between 12 inches and 60 inches in diameter and extend to thousands of miles in length. In addition, there are curves and bends along the pipeline with radii of curvature of generally about three times the pipeline diameter, though tighter bends are possible. Usually constructed of metal, in particular, ferrous metals, pipelines are susceptible to damage and other defects which affect the integrity of the system. The result can be a failure which threatens life and property, serious environmental damage, disruptions to both local and distant economies, and loss of the product being transported. The further result can be reduced public confidence in this efficient and economic means of transporting materials with possible public opposition to the growth of such means.

Pipelines, such as water mains and sewers, are vital to the quality of life of individual citizens and to the economic productivity of society. Over time, water pipelines will deteriorate, and eventually, they will fail entirely. Keeping these lines operable is a challenge faced by every community, both in terms of maintenance and repair costs and in terms of engineered capacity. In meeting these challenges, it is essential to have accurate information on the condition of the pipeline. Traditionally, communities have relied on indirect methods of deterioration detection, e.g., visible leaks, soil corrosion potential, statistical pipe break frequencies, pressure drops, soil settlement, etc., or by manually exhuming a portion of the pipeline in order to extrapolate the condition of the entire pipeline.

Many water distribution systems throughout the world have been in use for periods approaching or exceeding a century. Over time, the water systems have received varying degrees of maintenance, however, inspection is difficult without costly excavation. Often, no action is taken until a leak is detected, at which time the section surrounding the leak is excavated and repaired. System maintenance has often been limited to monitoring the failure rates for individual lines and performing replacement of an entire line or a long segment of it when leak frequency has exceeded tolerable values. This approach may lead to unnecessary replacement of considerable good pipe. As a result, there exists a need for a cost effective method to ascertain line condition. Since water lines are almost always buried, any applicable inspection method must be capable of operating solely within the bore of the pipe, to detect flaws such as corrosion and cracks through the entire thickness of the pipe.

In order to make inspection cost effective, it must be possible to perform the inspection with minimal preparation of the line, and, in particular, without having to excavate the lines. This means that the inspection device must be capable of accessing the line through existing access points, such as hydrants. The water pressure in lines is generally about 80 PSIG, and can reach pressures of 120 PSIG. The inspection device must be able to withstand such water pressures.

The inspection method must be useable with pipes made of inhomogeneous materials, such as cast iron. In addition, the presence of right-angle elbows and tees, large numbers of service taps and fittings, and the relatively large accumulations of scale typical of municipal water systems requires the use of a device which is flexible and able to flex around bends and fit through small openings.

There are several methods of inspection which offer the possibility of measuring pipe condition from the inside, and which are used for this purpose in other applications. Among these are ultrasonic, magnetic flux leakage, eddy current, and remote field eddy current technology.

Ultrasonic methods are used extensively to measure the thickness of many materials with one sided access only, and exhibit very good accuracy in most steels. Unfortunately, they do not work well in cast iron, because the grain size in cast iron approaches the ultrasonic wave length. This results in severe scattering and attenuation of the acoustic signal.

Flux leakage methods are used extensively in oil well casing and petroleum pipeline applications. They are limited by the requirements that the pipe be very clean inside to prevent sensor bounce, and that a substantially constant speed be maintained. The scale build-up typical of water lines prevents flux leakage inspection, as does the relatively great wall thickness of these lines. In addition, while this method is effective for the detection of localized sharp edged pits and cracks, it is very insensitive to general overall wall loss.

Eddy current methods have been the technique of choice for many years in the inspection of non-magnetic metal piping in applications such as air conditioning units and non-ferrous chemical process piping. In magnetic materials such as cast irons and carbon steels, the depth of penetration of eddy currents is greatly reduced, precluding inspection of the outside of the pipe, particularly when the pipe is of appreciable thickness. Attempts have been made to overcome this limitation by the use of constant magnetic fields to reduce the effective magnetic permeability of the material, but the thickness of typical water lines and the presence of scale make this method impractical for the inspection of these lines. Also, eddy current probes react strongly to changes in the distance between the sensors and the material under inspection, which requires that the inside of the pipe be very clean. For these reasons, this is not a viable method for water line applications.

Remote field eddy current (RFEC) is a relatively new electromagnetic inspection method which has become prominent in the last few years. The term "remote field eddy current" is used to describe the technique in which an alternating magnetic field is induced in the pipe by an excitation or source coil and the field as modified by the pipe material is detected at a location remote from the exciter coil. The detector must be spaced from the exciter coil a sufficient distance to eliminate direct coupling within the pipe between the exciter coil and the detector, and thereby overcome the problems associated with traditional eddy current methods. From classic eddy current equations one can derive an equation illustrating that flux density at any depth will be attenuated and delayed in time (shifted in phase) in a manner related to metal thickness. In particular, eddy current instruments detect a flaw by measuring the reduced attenuation, time delay and field direction the flaw produces as compared with a normal wall thickness. This perturbation in the inner wall electromagnetic field pattern caused by a flaw is highly localized in the vicinity of the flaw and will, to a limited extent, outline the shape of the flaw.

Utilities are responsible for the regular maintenance and integrity of their underground infrastructure. To minimize the risk of failure, pipelines are closely monitored and inspected. However, the methods described above are generally costly and difficult to apply.

There is a need for a means and a method for inspecting a buried pipeline or a utility which is easy and efficient.

SUMMARY OF THE INVENTION

The above-discussed disadvantages of the prior art are overcome by a device that is used to view utilities that have been potholed and covered up due to rain or crew shutdowns. The device includes a cylindrical body which is driven into the ground and has a light so the pipe can be viewed from above ground.

The system embodying the present invention provides convenient subterranean viewing without having to remove impeding soil.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
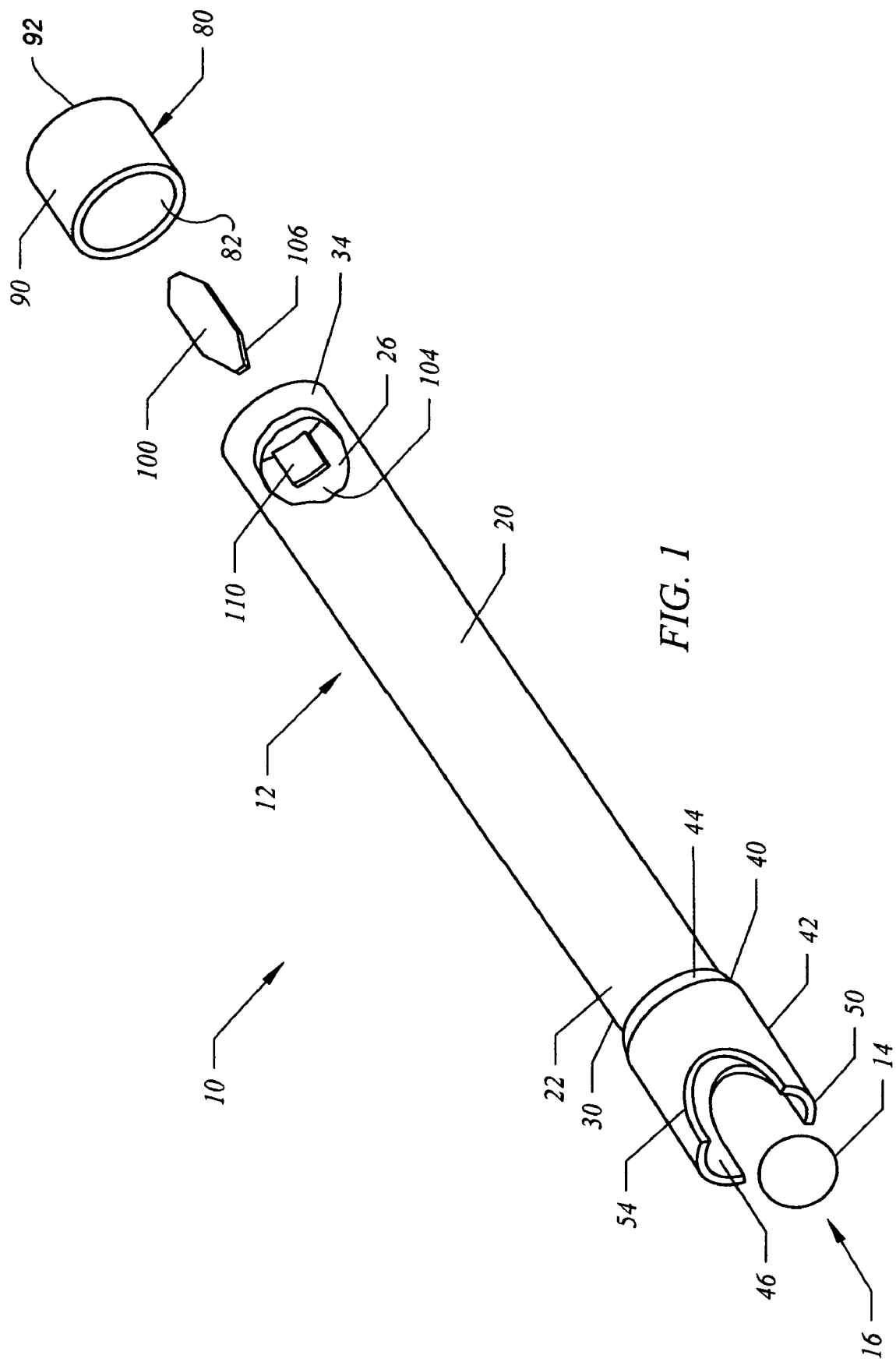
FIG. 1 is an exploded perspective view of an inspection unit embodying the principles of present invention.

Referring to the figures, it can be understood that the present invention is embodied in an inspection unit 10 that includes a device 12 which is used to inspect outside surface 14 of a utility or pipeline 16 that is located below ground and which may have been covered by soil.

Device 12 includes a tubular body 20 which has a first end 22 which is located adjacent to the outside wall 14 when the device is in use and which has a hollow bore 26 defined therein to extend axially of the tubular body from first end 22 that will be located adjacent to the pipeline when the device is in use and a second end 34 which will be located above ground when the device is in use.

Figure 3:
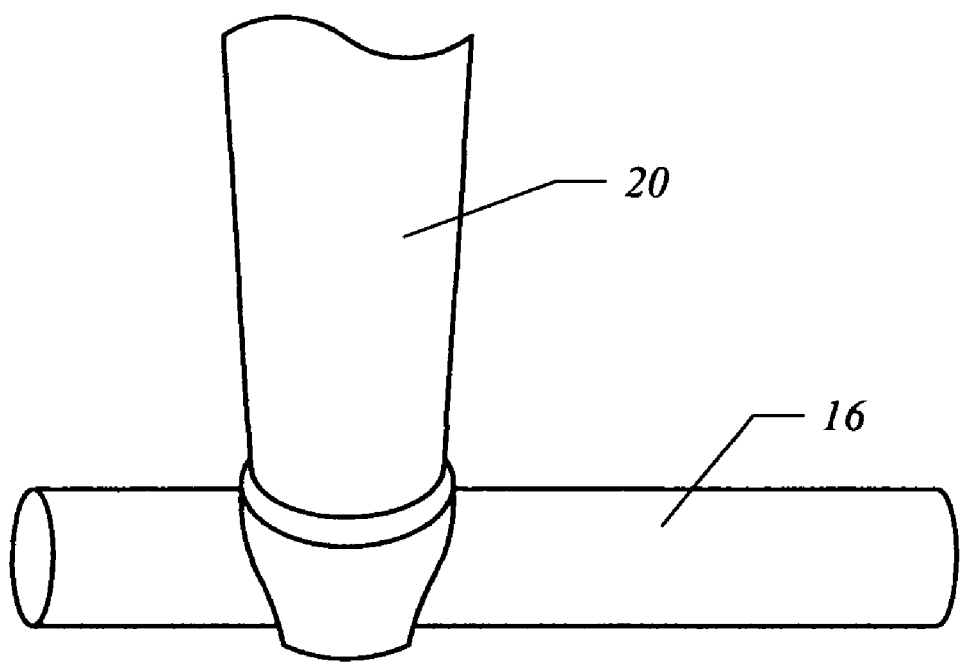
FIG. 3 shows the unit in use on a pipeline.

A pipeline-engaging cap 40 is mounted on first end 30 of the tubular body and includes a body 42 having one end 44 thereof mounted on the tubular body adjacent to first end 30 thereof and which has a tubular sidewall 46 that extends from end 44 to a rim 50 that will be located closely adjacent to the outside surface of the pipeline or utility. A cutout portion 54 is defined in the sidewall and is sized to accommodate the outside wall of the pipeline so the cap snugly engages the pipeline and positions the first end of the tubular body closely adjacent to the outside wall of the pipeline when the device is in use as can be understood from FIG. 3. The pipeline-engaging cap further includes an opening 60 (best seen in FIG. 4) defined therein adjacent to the cutout and in position to be aligned with the hollow bore in the tubular body so that a portion 70 of the outside wall of the in-ground pipeline located adjacent to the opening will be exposed to the hollow bore when the device is in use engaged with the in-ground pipeline.

Figure 4:
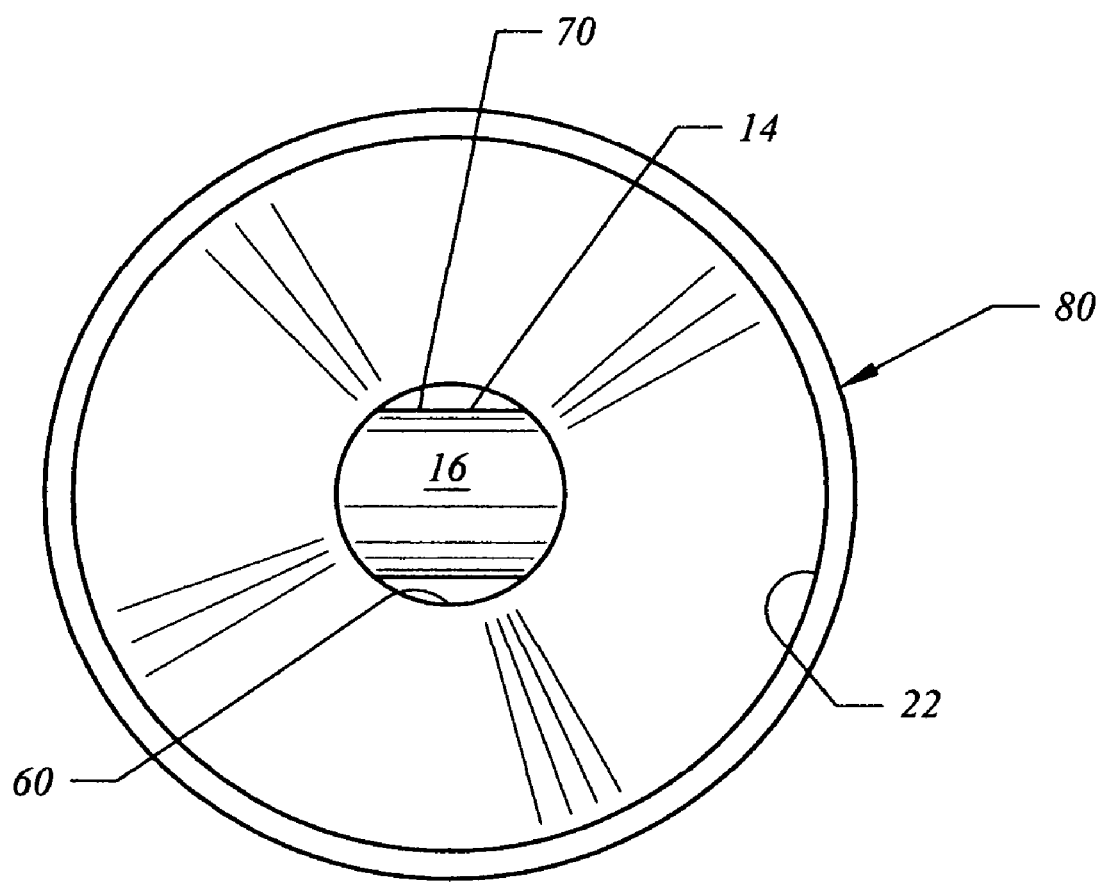
FIG. 4 is a view of a portion of a pipeline as seen through the inspection unit of the present invention.

Device 12 further includes a viewing cap 80 mounted on the second end of the tubular body. Cap 80 has an axial bore 82 that is aligned with the hollow bore of the tubular body. Bore 82 extends between a first end 90 of the cap and which is attached to the tubular body and a second end 92. Axial bore 82 of the viewing cap is open at the second end so, as shown in FIG. 4, a clear view can be produced between the second end of the viewing cap and the opening in the pipeline-engaging cap whereby the outside wall of the pipeline can be viewed through the second end of the viewing cap via the hollow bore in the body and the opening in the pipeline-engaging cap.

A light-generating element 100 is mounted on an inner surface 104 of the tubular body in the hollow bore. Light-generating element 100 has a forward end 106 which is directed towards the opening in the pipeline-engaging cap to direct light onto the outside wall of the pipeline located adjacent to the opening in the pipeline-engaging cap and is releasably mounted on the inner surface of the body by means 110 such as hook-and-loop fasteners.

Figure 2:
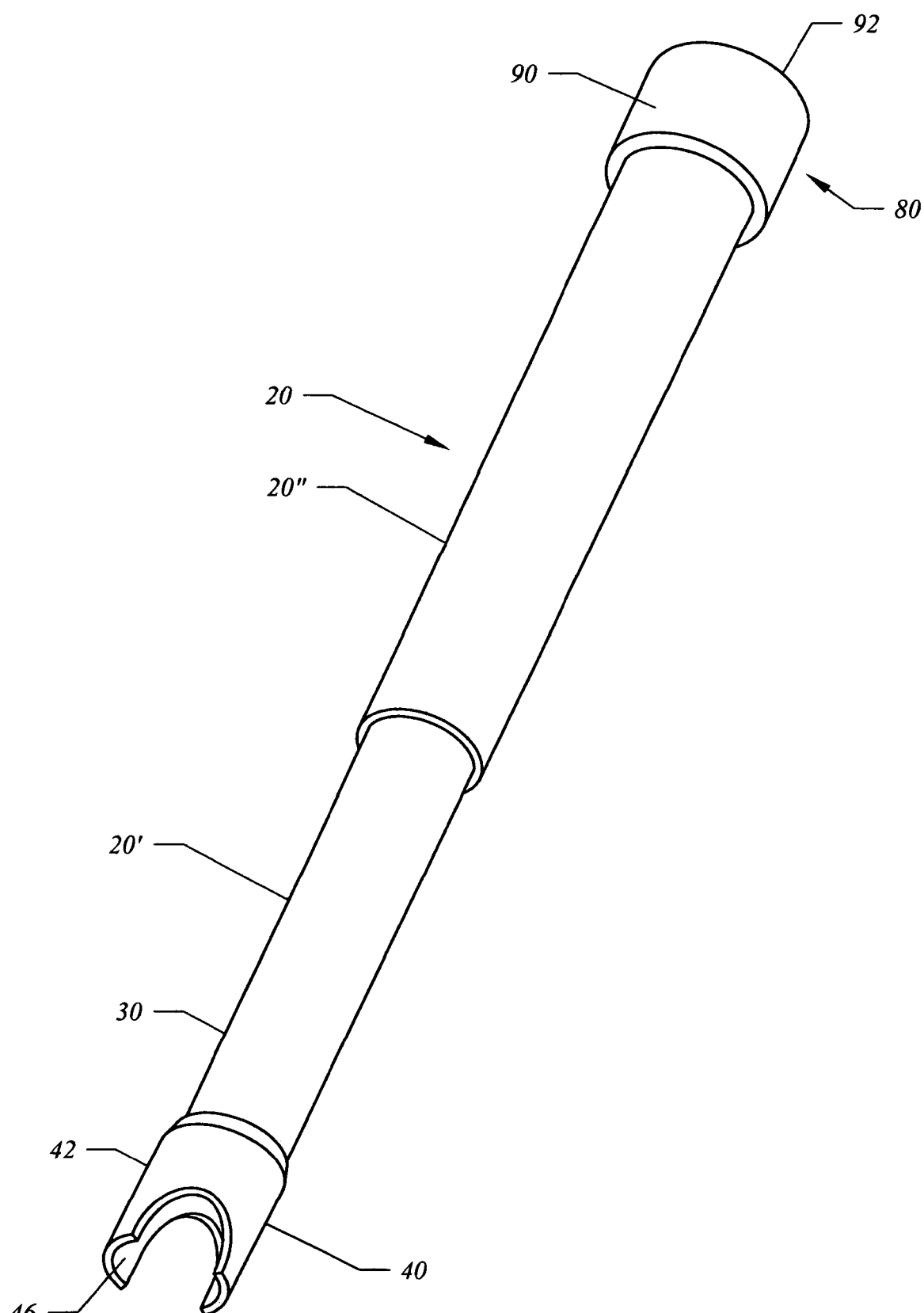
FIG. 2 is an assembled perspective view of an inspection unit embodying the principles of present invention

As indicated in FIG. 2, body 20 can include a plurality of portions, such as portions 20' and 20", so it can be telescoped into deeper holes.

In use, device 12 is moved into contact with a portion of a utility or a pipeline that has been buried so the pipeline is accommodated in the cutout portion of the engaging cap and the opening in the viewing cap is located close to the outside wall of the pipeline. The light-generating element is activated and a user views down into the device to view the outside surface of the pipeline as can be understood from FIG. 4.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An inspection unit comprising:
    A) an in-ground pipeline which has an outside wall; and
    B) a device for viewing the outside wall of the pipeline from above ground and which includes
        (1) a tubular body having a first end which is located adjacent to the outside wall when the device is in use, the tubular body having a hollow bore defined therein,
        (2) a pipeline-engaging cap on the first end of the tubular body, the cap including a cutout portion which is sized to accommodate the outside wall of the pipeline so the cap snugly engages the pipeline and positions the first end of the tubular body closely adjacent to the outside wall of the pipeline, the pipeline-engaging cap further including an opening defined therein adjacent to the cutout and in position to be aligned with the hollow bore in the tubular body so that a portion of the outside wall of the in-ground pipeline located adjacent to the opening will be exposed to the hollow bore when the device is in use engaged with the in-ground pipeline,
        (3) the tubular body having a second end which is spaced apart from the pipeline when the device is in use and which is located above ground when the device is in use, the hollow bore connecting the first and second ends of the body, (4) a viewing cap mounted on the second end of the tubular body and having an axial bore that is aligned with the hollow bore of the tubular body, the cap having a first end which is attached to the tubular body and a second end, the axial bore of the viewing cap being open at the second end so a clear view can be produced between the second end of the viewing cap and the opening in the pipeline-engaging cap whereby the outside wall of the pipeline can be viewed through the second end of the viewing cap via the hollow bore in the body and the opening in the pipeline-engaging cap, and (5) a light-generating element mounted on an inner surface of the tubular body in the hollow bore, the light-generating element having a forward end which is directed towards the opening in the pipeline-engaging cap to direct light onto the outside wall of the pipeline located adjacent to the opening in the pipeline-engaging cap.

2. The inspection unit defined in claim 1 further including a mounting element releasably mounting the light-generating element on the inner surface of the tubular body.

3. The inspection unit defined in claim 2 wherein the mounting element includes hook-and-loop fastener elements.

4. The inspection unit defined in claim 2 wherein the body of the device includes a plurality of portions.

5. A method for inspecting in-ground pipelines including:

A) providing an inspection unit with a device for viewing the outside wall of the pipeline from above ground and which includes (1) a tubular body having a first end which is located adjacent to the outside wall when the device is in use, the tubular body having a hollow bore defined therein, (2) a pipeline-engaging cap on the first end of the tubular body, the cap including a cutout portion which is sized to accommodate the outside wall of the pipeline so the cap snugly engages the pipeline and positions the first end of the tubular body closely adjacent to the outside wall of the pipeline, the pipeline-engaging cap further including an opening defined therein adjacent to the cutout and in position to be aligned with the hollow bore in the tubular body so that a portion of the outside wall of the in-ground pipeline located adjacent to the opening will be exposed to the hollow bore when the device is in use engaged with the in-ground pipeline, (3) the tubular body having a second end which is spaced apart from the pipeline when the device is in use and which is located above ground when the device is in use, the hollow bore connecting the first and second ends of the body, (4) a viewing cap mounted on the second end of the tubular body and having an axial bore that is aligned with the hollow bore of the tubular body, the cap having a first end which is attached to the tubular body and a second end, the axial bore of the viewing cap being open at the second end so a clear view can be produced between the second end of the viewing cap and the opening in the pipeline-engaging cap whereby the outside wall of the pipeline can be viewed through the second end of the viewing cap via the hollow bore in the body and the opening in the pipeline-engaging cap, and (5) a light-generating element mounted on an inner surface of the tubular body in the hollow bore, the light-generating element having a forward end which is directed towards the opening in the pipeline-engaging cap to direct light onto the outside wall of the pipeline located adjacent to the opening in the pipeline-engaging cap;

B) extending the device into the ground and locating the pipeline-engaging cap adjacent to the in-ground pipeline;

C) orienting the device with respect to the in-ground pipeline so a portion of the outside wall of the in-ground pipeline is accommodated in the cutout portion of the pipeline-engaging cap with the opening in the pipeline-engaging cap located closely adjacent to the portion of the outside wall;

D) locating the viewing cap above ground;

E) activating the light-generating element to shine light onto the portion of the outside wall of the in-ground pipeline located adjacent to the opening in the pipeline-engaging cap via the opening in the pipeline-engaging cap; and F) viewing the portion of the outside wall of the in-ground pipeline via the open second end of the viewing cap.

\* \* \* \* \*